United States Patent [19]
Broussaud

[11] 3,795,801
[45] Mar. 5, 1974

[54] ULTRASONIC DATA-PROCESSING SYSTEMS
[75] Inventor: Georges Broussaud, Paris, France
[73] Assignee: Thomson-CSF, Paris, France
[22] Filed: June 8, 1972
[21] Appl. No.: 261,104

[30] Foreign Application Priority Data
June 15, 1971 France .............................. 71.21602

[52] U.S. Cl. .......... 235/181, 181/0.5 NP, 324/77 R, 324/77 G, 340/5 H
[51] Int. Cl. .......................... G06g 7/19, B06b 3/04
[58] Field of Search ..... 235/181; 181/.5 AG, .5 NP; 340/5 H, 8 L; 73/67.6; 324/77

[56] References Cited
UNITED STATES PATENTS
3,431,462  4/1969  Muenow et al. ..................... 340/5 H
2,803,128  8/1957  Peterman ............................. 73/67.6
2,832,214  4/1958  Trommler ........................... 340/5 H
3,168,659  2/1965  Bayre et al. ........................ 340/8 L
3,295,629  1/1967  Papadakis .......................... 340/8 L 3,699,805  10/1972  Bayre ................................... 73/67.6

OTHER PUBLICATIONS
Knollman et al.: Variable Focus Liquid Filled Hydroacoustic Lens. Journal of the Acoustic Ser. of Am. pp. 253–261, Vol. 49, No. 1, 1971.

Primary Examiner—Felix D. Gruber
Attorney, Agent, or Firm—Cushman, Darby & Cushman

[57] ABSTRACT

The present invention relates to data-processing systems based upon the diffraction properties of a coherent radiation near a focus.

The data-processing system in accordance with the invention comprises at least one ultrasonic tank containing a fluid wherein coherent ultrasonic radiation propagates; this tank contains a modulating object on which there are transcribed the data being processed; ultrasonic focussing means provides by means of a Fourier transform the spatial frequency spectrum of said object.

24 Claims, 9 Drawing Figures

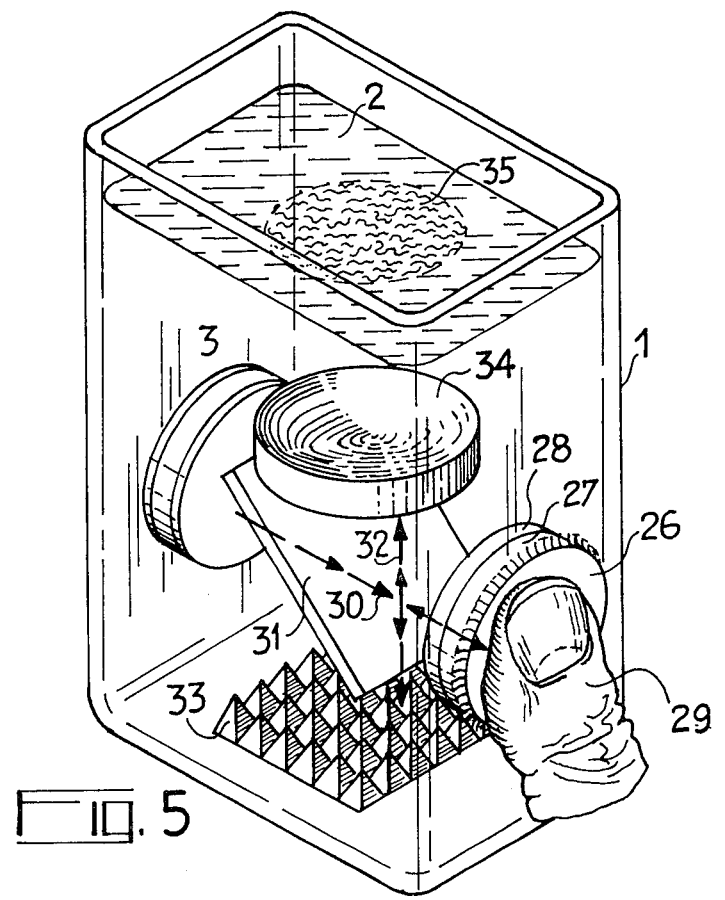
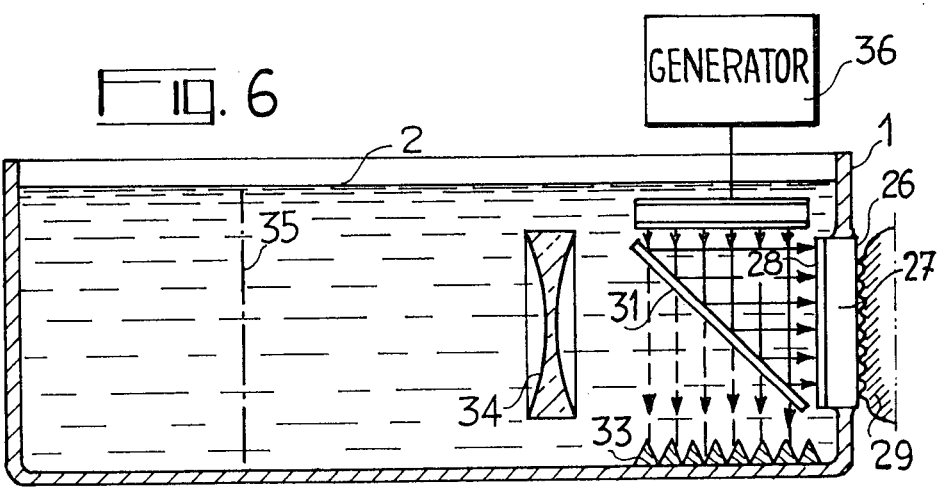

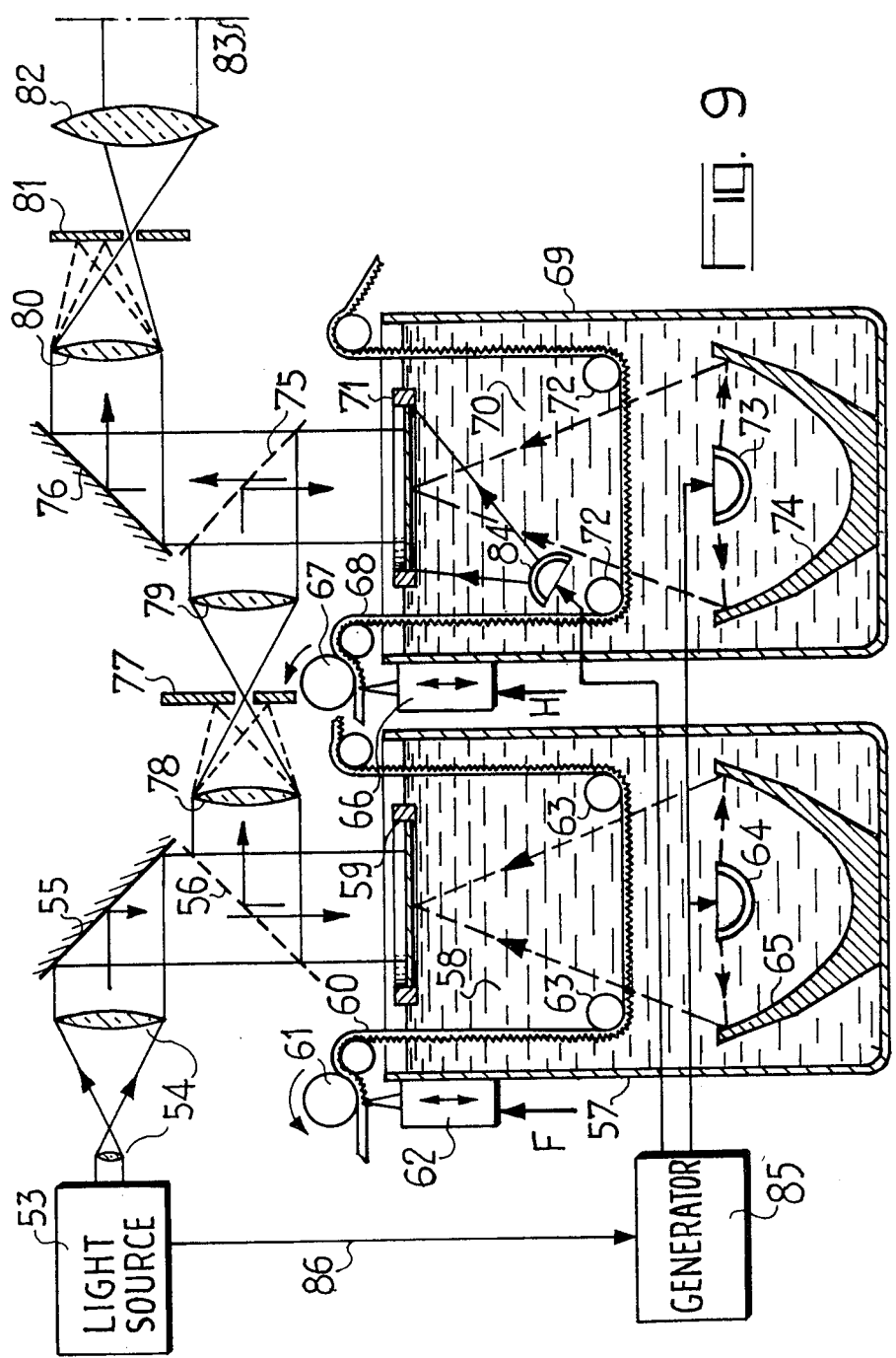

ULTRASONIC DATA-PROCESSING SYSTEMS

The present invention relates to data-processing systems whose operation is based upon the diffraction properties of coherent radiation. Systems of this kind are used in the optical field in order to carry out operations such as spectral analysis and spatial filtering ; in this case, the data take the form of optically modulating objects which are associated with one or more diffracting cells. In traversing these objects and cells, the complex amplitudes of an optical radiation experience physical transformations which are very closely related with the Fourier transform. As far as data transcription in concerned, the starting point can take the form of modulating objects which carry an arbitrary graphic pattern or the mark left on a surface by an impression, but it frequently happens that the data are constituted by electrical signals. The exploitation of the properties of optical diffraction in a data-processing system gives rise to problems because the manufacturing and assembly tolerances must be in the same order of magnitude as the wavelength of the radiation used. In addition, at the point in the system where data transcription takes place, the details of the modulating object must be sufficiently fine and close in order to observe an effective spread-out of the diffraction pattern. These difficulties mean that the construction of the modulating objects is a more delicate operation than the ensuing processing ; it results that the data transcription time, too, is the longest part of the process. Another difficulty inherent in optical processing systems is that the accuracy of the results depends very much upon what measures are taken to eliminate parasitic phase-modulation effects. This leads to the use of perfectly flat and isotropic data-carriers as well as to lenses of high optical quality ; a precaution which often has to be taken is to immerse the data-carrier in a fluid which has substantially the refraction index of the data-carrier, so that no phase errors are introduced.

The foregoing observations show that optical data-processing systems are delicate and expensive instruments which do not generally enable real-time processing of data.

In order to overcome these drawbacks, the invention provides for the substitution of the electromagnetic waves occurring in the optical systems, by ultrasonic waves propagating through a fluid. The wavelength of the ultrasonic waves is chosen in order to establish a compromise between the complexity of the data transcription devices and the processing capacity of the other component parts of the system.

According to the present invention there is provided : an ultrasonic data processing system comprising : at least one ultrasonic tank containing a fluid, a source of ultrasonic radiation positioned for emitting through said fluid a beam of ultrasonic energy, at least one diffraction cell positioned for receiving said beam, and ultrasonic detection means positioned for collecting the ultrasonic energy emerging from said diffraction cell ; said diffraction cell comprising : stigmatic ultrasonic means positioned for focussing said beam onto a spectral plane pertaining to said cell and ultrasonic modulating object means positioned on the path of said beam for modulating said ultrasonic energy in accordance with data supplied to said processing system ; said ultrasonic energy being constituted by ultrasonic longitudinal waves travelling through said fluid ; said ultrasonic longitudinal waves being, upon irradiation of said ultrasonic modulating object means, reradiated for projection onto said spectral plane.

For a better understanding of the invention and to show how the same may be carried into effect reference will be made to the ensuing description and the attached figures in which :

FIG. 5 is an isometric view of a spectrum-generating ultrasonic tank designed to receive data for processing, in the form of a relief impression applied to a supporting surface of the tank.

FIG. 6 is a variant embodiment of the device shown in FIG. 5.

FIG. 9 illustrates a real-time data-processing system for producing the auto-correlation function of a signal or the cross-correlation function of two signals.

Analog data-processing systems are generally based upon the diffraction phenomena near a focus.

In coherent optical systems, when light radiation is focussed for forming a spherical wave whose wavefronts are centred on a point, there is a fundamental relationship between the complex amplitudes of the illumination received in the focal plane, and the complex amplitudes of the luminance function along any one of these wavefronts. If $x$ and $y$ are the coordinates of a point upon a selected wavefront and $S(x, y)$ the complex amplitude of the vibration carried by the radiation at this point, then it can be shown that the complex amplitude $E(u, v)$ of the vibration received at a point having the coordinates $u$ and $v$ in the focal plane, is given by the integral :

$$E(u, v) = \frac{jR}{\lambda} \int\int S(x, y) e^{-j\frac{2\pi}{\lambda}(xu+yv)} dx \cdot dy$$

This integral is the expression for a two-dimensional Fourier transform which also has a reciprocal property ; in this formula, R represents the radius of curvature of the wavefront and $\lambda$ the wavelength of the radiation.

Optical data-processing systems of course perform operations of this kind by means of coherent light vibrations, but it is equally possible, as we shall see hereinafter, to carry out the same operations just as naturally by making use, and this indeed more simply, of mechanical vibrations carried in the form of longitudinal ultrasonic waves in a compressible fluid.

The basic cell of an ultrasonic data-processing system in accordance with the invention is thus essentially constituted by an ultrasonic tank containing a compressible fluid and a coherent ultrasonic radiation source producing radiation of wavelength $\lambda_A$. In the tank, a device is immersed for focussing the ultrasonic radiation on a spectral plane, and in the neighbourhood of this device there is introduced a modulating object upon which there have previously been transcribed the data for processing. This kind of cell, followed by an appropriate radiation detector, constitutes an ultrasonic spectrum analyser which can process signals represented by a one or two dimensional function. However, without departing from the scope of the invention, it is equally possible to add to the first processing cell another cell in order to effect two successive Fourier transforms; in this case, the data-processing system becomes a double-diffraction system which can filter spatial frequencies of one set of data as a function of other data introduced between the cells in the form of a filter.

Figure 1:
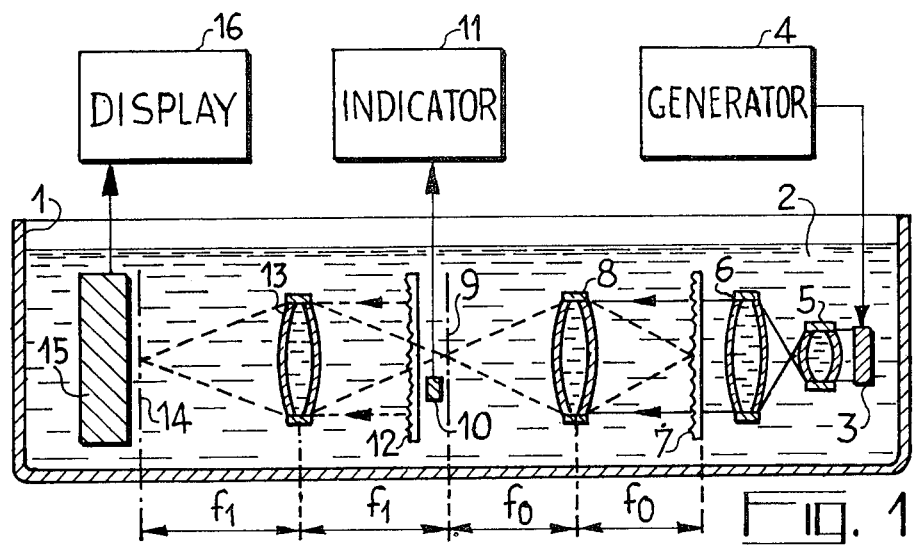
FIG. 1 illustrates a first example of a data-processing system in accordance with the invention.

A first embodiment of a data-processing system in accordance with the invention has been schematically illustrated in FIG. 1. In its most comprehensive form it comprises a double-diffraction ultrasonic system. It incorporates an ultrasonic tank 1 containing a compressible fluid 2 wherein longitudinal ultrasonic waves are propagated without dispersion and excessive attenuation. An electromechanical transducer 3 connected to an electrical generator 4, radiates a parallel ultrasonic beam of wavelength $\lambda_A$ which propagates through the fluid 2 from right to left in FIG. 1. An afocal device immersed in the fluid 2 enlarges the transverse section of the beam radiated by the transducer 3; this device is made up of a pair of convergent ultrasonic lenses 5–6. These lenses can be constituted by a cavity with convex faces enclosing a fluid which is capable of transmitting the ultrasonic waves at a propagation velocity lower than that of the fluid 2. By way of a non-limitative example, the fluid 2 can be constituted by water whilst the fluid filling the lenticular cavities 5-6 is methylene iodide. The ultrasonic radiation emerging from the lens 6 illuminates an ultrasonic modulating means constituted by an object 7 which transmits the incident radiation with complex vibrational amplitudes representing the data being processed. The radiation modulatd by the ultrasonic modulating object 7 passes through a convergent ultrasonic lens 8 arranged so that its two foci are located respectively in the plane of the object 7 and in a spectral plane 9 perpendicular to the plane of FIG. 1; the focal length of the lens 8 is equal to $f_o$ and, as FIG. 1 shows, this lens focusses the parallel beam coming from the lens 6 in a geometric way in the plane 9.

In fact, if we take into account the presence of the ultrasonic modulating object 7 and the effects of the diffraction, then it will be realised that the distribution of the complex vibration amplitudes received by the plane 9 represents the spectrum of the spatial frequencies of the distribution of the complex vibrational amplitudes emerging from the object 7. Consequently, lens 8 is a stigmatic ultrasonic means building up with the plane of the object 7, and the spectral plane 9, a first diffraction cell having the property of displaying within plane 9 the Fourier transform of the distribution emerging from the object 7, the latter being representative of the data being processed.

If an ultrasonic detector 10 is immersed in the fluid 2 and connected to an indicating instrument 11 in order to scan the spectral plane 9, the elements located to the right of the plane 9 form a spectral analyser.

On the other hand, as FIG. 1 shows, more efficient data-processing can be effected by means of a second diffraction cell made up of the elements represented at the left of the spectral plane 9. This second cell lies on the left hand of filter 12 and comprises a convergent ultrasonic lens 13 with a focal length $f_1$. A plane 14 perpendicular to the plane of the figure is disposed in relation to the object 7 and the lenses 13 and 8 in such a manner as to pick up, after a double diffraction, the ultrasonic image of the object; it is for this reason that it is called the "image plane." In the absence of the filter 12 and neglecting the diffraction, the image observed in the plane 14 has substantially the same distribution of vibrational amplitude as that emerging from the object 7. However, if we take into account the action of the filter 12 and bear in mind, too, the properties of the Fourier transform, the ultrasonic image received in the plane 14 will present a distribution of complex vibrational amplitudes which is expressed by the convolution integral. More precisely, if the coordinates of the object plane are $(x_o, y_o)$, if those of the spectral plane 9 are $(u, v)$ and if $(x_i, y_i)$ are the coordinates of the image plane 14, then we can write:

$$f(x_i, y_i) = \int \int h[(x_i - x_o), (y_i - y_o)] \cdot f(x_o, y_o) dx_o \cdot dy_o$$

where $g(x_i, y_i)$ is the distribution of complex amplitudes in the image plane;

$f(x_o, y_o)$ is the distribution of complex amplitudes of the object;

$h(x_i, y_i)$ is the distribution of complex amplitudes in the image plane in relation to the response of the diffractive system to the Dirac delta function.

The foregoing integral can be written in condensed form as follows:

$$g(x, y) = f(x, y) * h(x, y).$$

In addition, if the Fourier transforms of the functions g, f and h are respectively: G $(u, v)$, F $(u, v)$ and H $(u, v)$, then from the theorem of the Fourier transform we know that we can write the foregoing expressions as:

$$G(u, v) = F(u, v) \cdot H(u, v).$$

This simple expression shows us in a simple manner how the spectrum of the spatial frequencies G $(u, v)$ transmitted by a filter 12 results from the multiplication of the spectrum of the spatial frequences F $(u, v)$ feeding the filter 12 by its own transfer function H $(u, v)$. Consequently, if we arrange a radiation detector 15 and a display device 16 at the end of the double-diffraction system shown in FIG. 1, then an apparatus is created which will make it possible to arbitrarily filter the spatial frequencies and in particular to establish a correlation between data suitably transcribed at ultrasonic modulating object means 7 and at a filter 12 performing a similar function.

Figure 2:
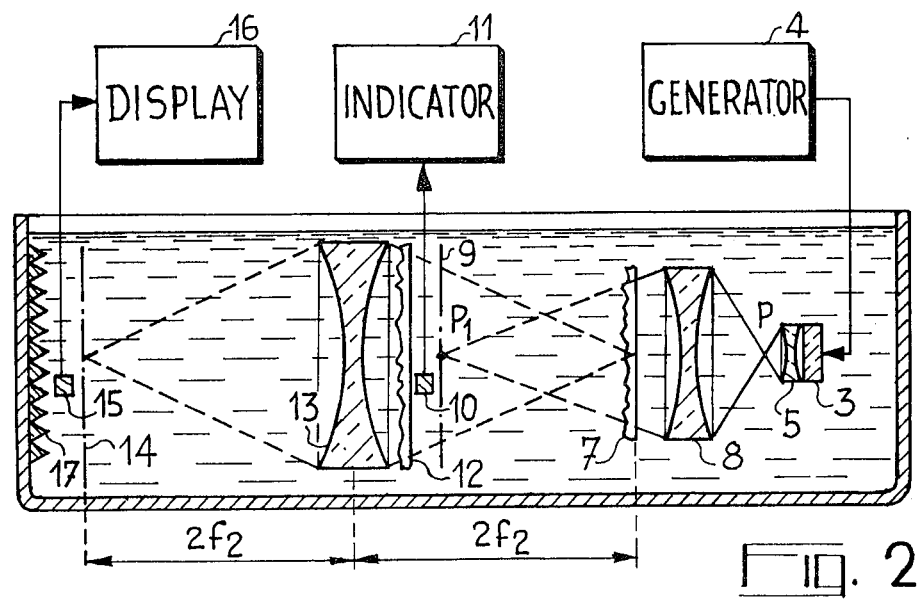
FIG. 2 illustrates a second example of a data-processing system in accordance with the invention.

The special feature of the double-diffraction ultrasonic system shown in FIG. 1 is that it utilises stigmatic ultrasonic means such as lenses 8 and 13 in order to make parallel beams converge in planes 9 and 14. In FIG. 2, another version of the double-diffraction system in accordance with the invention can be seen.

In this simplified version, the elements have been given references corresponding to those of the similar elements in FIG. 1. The system of FIG. 2 differs from that of FIG. 1 by its use of solid ultrasonic lenses 5, 8 and 13 which, whilst being convergent lenses, have a concave profile. By way of non-limitative example, if the fluid 2 is water, the lenses 5, 8 and 13 are made of polystyrene, which material propagates compressive ultrasonic waves with a velocity 1.8 times higher than the velocity of these same waves in water. Since the lenses are made of a solid material, it must be ensured that this material has the least possible degree of transmission for transverse waves because these latter constitute a parasitic vibratory mode ; this condition is amply satisfied if polystyrene or paraffin is used.

As far as the arrangement of the lenses 5, 8 and 13 is concerned, it will be seen from a consideration of FIG. 2 that the lens 5 focuses the ultrasonic radiation at the focus P ; the lens 8 of the first diffraction cell forms at $P_1$ the image of P and the lens 13, of the second diffraction cell, forms the image of the object 7 in the image plane 14; the focal length of the lens 13 is $f_2$.

The double-diffraction system of FIG. 2 operates on the same principle as that of FIG. 1 but using lenses which are simpler to manufacture and are not required in such large numbers. The systems of FIGS. 1 and 2 can employ stigmatic ultrasonic means made of spherical or cylindrical lenses, depending upon whether or not the Fourier transforms carried out are two-dimensional, or single dimensional ones. Furthermore, as concerns the stigmatic ultrasonic means building up the diffraction cells the invention is not limited to the use of ultrasonic lenses because, as we shall see at a later point in the description, they can equally well be replaced by mirror systems. The projection of longitudinal ultrasonic waves into an ultrasonic tank can give rise to parasitic reflections ; these can be eliminated by lining the walls of the tank with materials which absorb ultrasound ; FIG. 2 illustrates the application of this kind of lining 17, to the vertical wall of the tank 1.

Figure 3:
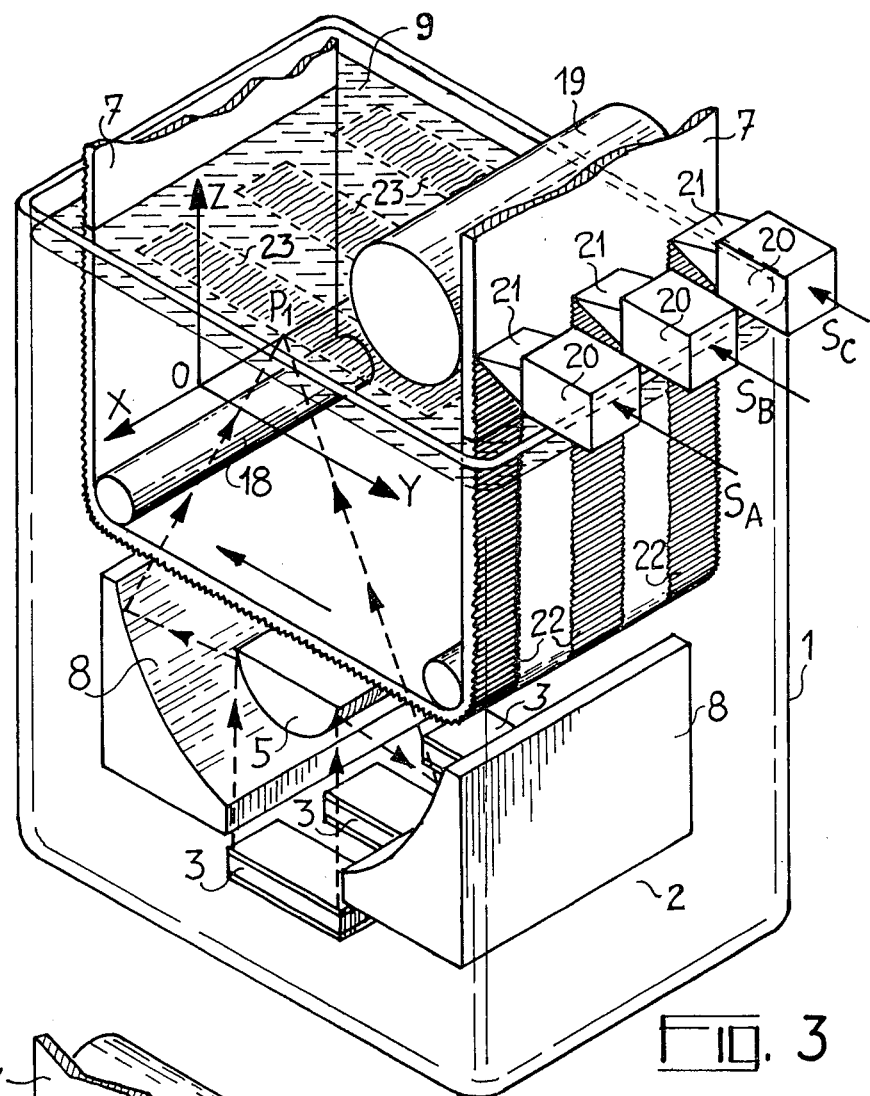
FIG. 3 illustrates an isometric view of a spectrum-generating ultrasonic tank in accordance with the invention, equipped with multichannel data transcription means.

Hitherto, we have left aside the business of the transcription of the ultrasonic modulating data, that is to say the creation of the object means 7 and the filter 12. In FIG. 3, an example of a spectrum-generating ultrasonic tank capable of the real-time processing by single-variable Fourier transform, of a set of separate electrical signals $S_A$; $S_B$ and $S_C$ constituting the data, can be seen. The signals $S_A$, $S_B$ and $S_C$ are, for example, physiological signals utilised for the plotting of an electrocardiogram or an electro-encephalogram ; they may equally well be geophysical signals supplied from a seismograph.

The ultrasonic processing system of FIG. 3 comprises an ultrasonic tank 1 containing a fluid 2 whose surface 9 is parallel to the reference trihedron OXYZ. A set of transducers 3 immersed in the fluid 2 radiates ultrasonic energy travelling parallel to OZ ; this energy is contained in directional ultrasonic beams ; these are received by the parabolic cylindrical face of a first reflector 5. A pair of reflectors 8 having reflective faces in the form of elliptical cylinders, respectively focus the ultrasonic beams along focal lines aligned end to end in the surface 9 ; in order to illustrate the trajectory of the ultrasonic energy, rays indicated in broken line and converging at the point $P_1$ have been shown. Between the surface 9, which is a spectral plane, and reflectors 5 and 8, a modulating object 7 is arranged which can move in the direction of the arrow between two carrier rollers 18. This object is produced by the mechanical engraving of a band of thermoplastic material passing between a cylinder 19 and a set of engraving cutters 21 ; these latter are operated by electromechanical transducers 20 which receive the electrical information for processing. The viscosity-temperature characteristic of thermoplastic materials, exhibits a discontinuity at a given temperature. This property can be exploited in order to deform a thermoplastic substrate raised to said temperature, through the action of extremely small forces; if the thermoplastic substrate is cooled immediately after having undergone this deformation, it retains a print which does not change afterwards.

Having chosen a thermoplastic material in which ultrasonic waves are transmitted at a velocity differing from the velocity of propagation characterizing the environment, it is possible, thanks to the printing action of cutters 21 and under the control of the signals $S_A$, $S_B$ and $S_C$, to linearly modulate the thickness of the band along a generatrix of the cylinder 19 ; the cylinder 19, by its rotation, transports the band past the engraving tools 20, 21, giving rise to the engraved tracks 22. The deformation of the band is more readily brought about by raising it to the temperature referred to hereinbefore ; to this end, heating means, which have not been shown, are associated with the cylinder 19 or the cutters 21. After engraving, the printed tracks 22 enter the fluid 2 and act, between the rollers 18, as phase objects 7. The ultrasonic radiation whose phase is modulated by these variable-thickness tracks, is projected into the surface plane 9 in the form of spectral patterns 23 of rectangular shape which can be detected by means of a hydrophone scanning the surface 9. It goes without saying that the spectral plane can likewise be located below the surface 9 of the fluid 2 and that any detector arrangement other than a hydrophone, could be used to pick up the spatial frequencies of the signals $S_A$, $S_B$ and $S_C$. The fineness of prints 22 as well as the positional tolerances governing the element constituting the data-processing ultrasonic tank shown in FIG. 3, have to be in the same order of magnitude as the wavelength $\lambda_A$ of the ultrasonic radiation in the fluid 2.

This condition makes the best ultrasonic frequency range for working, that between 30 and 300 MC/s, and in the case of water this corresponds to a wavelength $\lambda_A$ ranging between 50 and 5 microns. The utilisation of substantially higher ultrasonic frequencies, would give rise to the multiple drawbacks encountered in optical processing systems, whilst the utilisation of substantially lower ultrasonic frequencies would mean a reduction in the quantity of data which could be processed.

The electromechanical data transcription system by the ultrasonic modulating object means shown in FIG. 3, produces a modulating object 7 whose engraved print is a function of only one variable, in the case of each of the three tracks provided.

Figure 4:
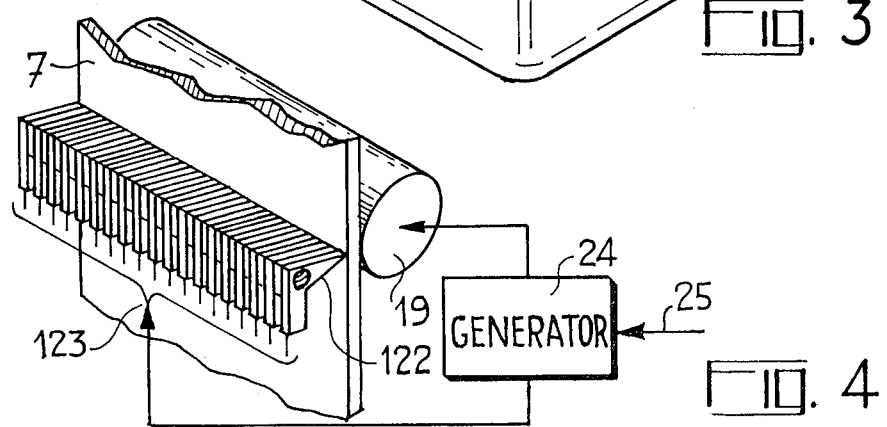
FIG. 4 illustrates a variant embodiment of the data-transcription means shown in FIG. 3.

FIG. 4, shows a system wherein ultrasonic modulating object means provide a data transcription which is based upon the utilisation of electrostatic forces, in order to deform the thermoplastic substrate 7. The system comprises a comb whose conductive teeth 122, insulated by spacers, receive voltages from an electrical generator 24, which are applied between a set of electrodes 124 belonging to the comb and a heated metal cylinder 19. The input 25 of the generator is supplied with the data for transcription and successively supplies potential distributions along the comb, which deform the substrate 7 in accordance with a succession of parallel lines stepped in the direction of vertical displacement. These ultrasonic modulating object means enable an impression to be formed upon the substrate 7, which is a function of two variables. If the device shown in FIG. 4 is employed in the processing system of FIG. 3, in order to produce a two-dimensional Fourier transform, only one transducer 3 need be used, which is centred in relation to the reflectors 5 and 8 and has a vertical axis of revolution.

The data transcription devices illustrated in FIGS. 3 and 4 are designed for data supplied in the form of electrical signals.

In FIG. 5, a spectrum-generating ultrasonic tank can be seen which is designed to receive data for processing, in the form on an existing impression the relief pattern of which has only two significant levels. This kind of network of striata is encountered in particular when processing digital impressions or again when the data for processing are constituted by a text or block in the form of a relief.

The system shown in FIG. 5 comprises an ultrasonic tank 1 containing a fluid 2 ; in a lateral wall of the tank and below the level of the fluid, are assembled ultrasonic modulating object means comprising an impression receiver device embodying one or more layers 27 and 28 of elastic materials. The layers 27 and 28 are used to match the impedance of the fluid 2 to that of the material of which the substrate 29 carrying the impression is made, which substrate is applied against the external face 26 for insuring data transfer.

At the point of intimate contact between the projecting parts of the impression and the face 26, the ultrasonic energy is transmitted without reflection but at the intertices, where there is no contact, the ultrasonic energy experiences major reflection. This process of ultrasonic modulation by reflection requires that a uniform ultrasonic beam be directed from the interior of the fluid 2 onto the face 26. To this end, an ultrasonic transducer 3 immersed in the fluid 2 emits ultrasonic radiation propagating in the direction 30 ; the radiation selectively reflected at the face 26 is propagated in the reverse direction and subsequently passes up towards the surface of the fluid 2 along the trajectory 32. A semi-reflective plate 31 is immersed in the fluid 2 in order to direct the modulated ultrasonic energy towards the top of the tank ; the ultrasonic energy coming from the transducer 3 for the most part passes through the plate 31 whilst the non-transmitted energy fraction is absorbed by an appropriate coating 33 located at the bottom of the tank. Between the surface of the fluid 3 and the plate 31, the modulated ultrasonic radiation encounters a convergent ultrasonic lens 34 which projects to the surface of the fluid 2 the spectrum of the spatial frequencies 35 of the impression applied against the receiver face 26. Plate 31 may be made of any layer having an acoustical impedance differing from that of the surrounding medium.

In FIG. 6, a spectrum-generating system can be seen whose constituent parts are practically identical with those of the system shown in FIG. 5 ; to simplify matters, the same references have been used in both figures. The element 36 is an ultrasonic generator not shown in FIG. 5.

From the foregoing, we have seen that the impression-receivers of FIGS. 5 and 6 constitute ultrasonic modulating object means operating by reflection, whilst those of FIGS. 1 to 3 operate by transmission. In the case of modulation by reflection, it is the modulus of the complex vibrational amplitude in the right section of the beam, which experiences the modulation, the argument remaining substantially constant. In the case of modulation by transmission, the reverse situation applies ; the ultrasonic modulating object is then a phase object which is substantially transparent to ultrasonic waves.

Although the use of a phase object in no way impedes the formation of an easily perceptible spectrum of spatial frequencies, in a double-diffraction ultrasonic system it may be desirable for the object to be an amplitude-modulating object.

Figure 7:
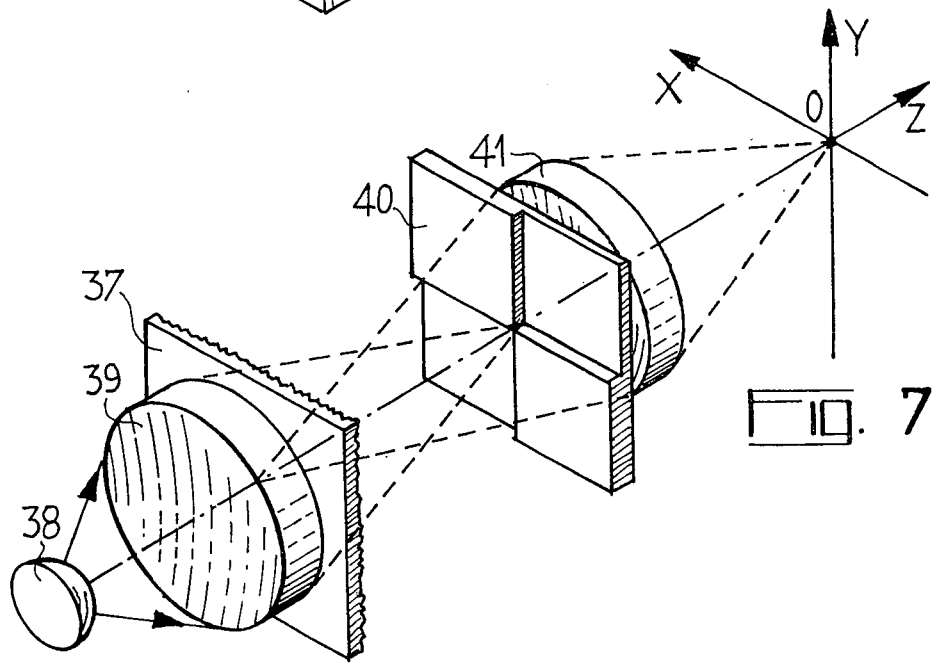
FIG. 7 illustrates a phase-contrast arrangement in accordance with the invention.

In FIG. 7, a phase-contrast ultrasonic arrangement can be seen associated with the phase object 37 which, in an exit plane OXY, can produce a non-uniform distribution of ultrasonic vibrational amplitudes. This arrangement, which is normally immersed in a fluid, essentially has the same structure as the double-diffraction ultrasonic system of FIG. 2. It comprises an ultrasonic source 38 illuminating the phase object 37 across a convergent ultrasonic lens 39. A filter 40 is arranged perpendicularly to the axis 0Z at the location where the lens 39 in the geometric sense forms the point image of the source 38; another convergent ultrasonic lens 41 arranged behind the filter 40, forms the ultrasonic image of the object 37 in the plane XOY.

The filter 40 is a phase plate divided into four quadrants ; the thickness of the plate changes abruptly in passing from one quadrant to the next, in order to introduce a phase difference of half a wavelength in the respective ultrasonic vibrations passing through these quadrants. The result is that the spectrum of spatial frequencies projected onto the filter 40 by the combination of the elements 38, 39 and 37 is multiplied by a filter function of constant modulus and whose argument changes by $\pi$ in passing from one quadrant to the next.

At the output of the filter 40, the filtered spectrum passes through the lens 41 which projects the image of the object 37 ; this image corresponds to a distribution of complex vibrational amplitudes whose modulus varies in the x and y senses in correspondence with the phase variations which characterize the distribution of the complex vibrational amplitudes emerging from the object 37. Bearing in mind the law governing the filtering function of the filter 40, it can be shown that the processing which the phase object 37 experiences is a two-variable Hilbert transform.

The arrangement shown in FIG. 7, provides an example of data-processing by filtering of the spatial frequencies, in which the filter design is particularly simple. In the more general case where the aim is to effect a convolution between two sets of data or where it is desired to determine by correlation the positions occupied in a text by a given character, the problem arises of engraving the filter so that its filter function is the Fourier transform of a predetermined function or the complex conjugate of this transform.

Figure 8:
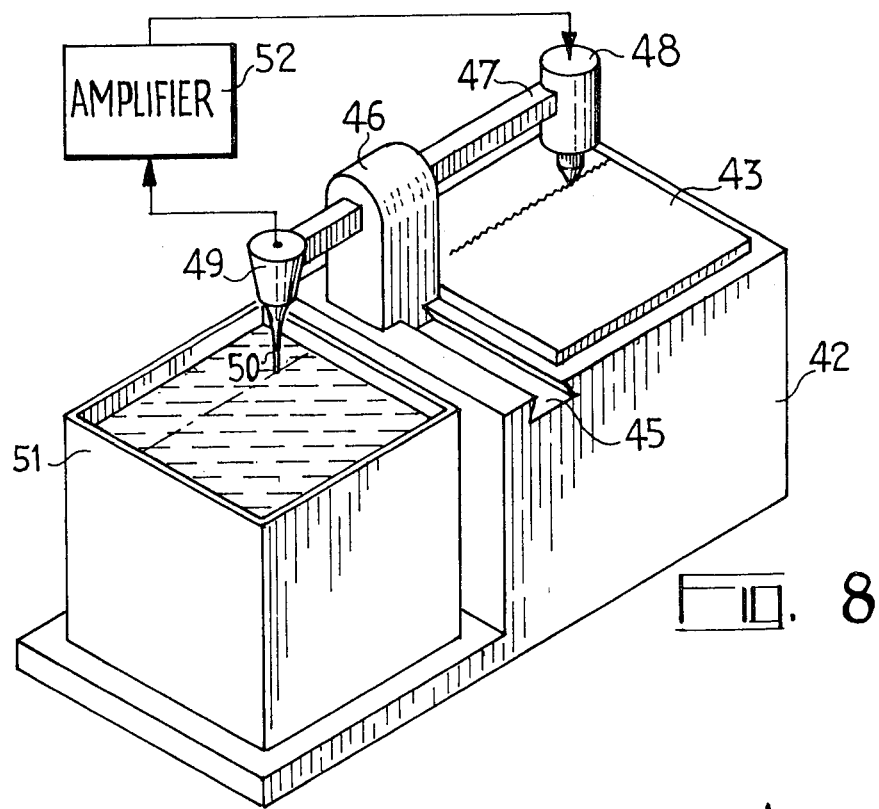
FIG. 8 illustrates a device for constructing a filter in accordance with the invention.

In FIG. 8, an apparatus can be seen which is intended for the construction of a filter suitable for the case of either convolution or correlation.

In order to construct a filter of this kind, there are available, a priori, data representing the Dirac delta responce $h(x_i, y_i)$ and the technique is to engrave a substrate capable of imposing upon ultrasonic radiation passing through it, a phase-modulation which represents either the Fourier transform function $H(u, v)$ or $h(x_i, y_i)$, or the conjugate function $H^*(u, v)$ of $H(u, v)$. To this end, an engraving table 42 can be employed to the top of which a blank substrate 43 has been attached. A slide 45 on the table 42 guides a carriage 46 carrying a sliding bar 47 ; the bar 47 can be displaced perpendicularly and parallel to the slide 45 in order that its ends can synchronously scan identical fields one of which is aligned above the substrate 43 and the other above an ultrasonic tank 51 carried by the table 42. An engraving head 48, controlled electrically, is assembled at one of the ends of the bar 47 and a hydrophone 49 with an ultrasonic detector probe 50, at the other. The electrical signals produced by the hydrophone 49 are received by an analyser circuit 52 which controls the engraving head 48 as a function of their amplitude or phase in relation to the ultrasonic field generated in the tank 51. The tank 51 is similar to the ones shown in FIGS. 3 and 5. At the surface of the fluid which it contains, it produces a distribution H $(u, v)$ of complex vibrational amplitudes, which represents the Fourier transform of the data $(x_i, y_i)$ supplied to the transcription device. This distribution is analysed by the detector 50 whose free end is flush with the surface of the fluid ; the engraving head 48 imprints in the substrate 43 an impression corresponding to the analysis effected by the detector 50 and, because these two elements displace in synchronism with one another, it can readily be arranged that the impression engraved in the substrate represents in full the function H $(u, v)$. It should be pointed out that the engraving head 48 can be equipped with an engraving tool displacing perpendicularly to the substrate but it is also possible to use an optical engraving method followed by chemical processing in order to produce at the surface of a photographic substrate a relief corresponding to the desired phase-modulation. If the data-processing system is used as a correlator, the filter can be constituted by a Fourier hologram. In this case which provides an impression corresponding to the conjugate of the function H$(u,v)$, the tank must contain a further ultrasonic source which superimposes upon the spectrum H$(u,v)$ of spatial frequencies of the modulating object, a reference ultrasonic wave. The device shown in FIG. 8 offers the possibility of producing a filter by engraving its impression in the form of successive lines. The time taken to engrave a filter means that it is not possible to obtain the processed results at the same instant at which the data are supplied to the processing system.

In FIG. 9, a correlator system can be seen which comprises two ultrasonic tanks, 57 and 69, optically coupled to one another, and an optical device for producing the correlation function of data whose spectral analysis is effected by the ultrasonic tanks. The data for processing are applied in the form of electrical signals F and H to transcription devices 62 and 66 which are capable of recording on thermoplastic substrates 60 and 68, impressions which act as ultrasonic modulating object means. The driving and heating of the substrates 60 and 68 are effected by cylinders 61 and 67 ; they are carried beneath the level of the fluid filling the vessels 57 and 69, by means of guide rollers 63 and 72. Each tank contains an ultrasonic radiation source 64 or 73 located at one of the foci of an elliptical-section reflector 65 or 74. An electrical generator 85 supplies the sources 64 and 73. Thanks to the reflectors 65 and 74 which act as ultrasonic stigmatic means, the ultrasonic radiation components are made to converge at the other focus located in the neighbourhood of the surface of the fluid contained in each of the tanks 57 and 69 ; the horizontal portions of the ultrasonic modulating objects 60 and 68 being located close to the exit pupils of the reflectors 65 and 74, there are picked up at the surfaces of the tanks 57 and 69 distributions of complex ultrasonic amplitudes which correspond to the spatial frequency spectra of the signals F and H. In order to pick up and transmit these distributions, a coherent light source 53, through the medium of the mirror 55 associated with an afocal device 54, vertically illuminates the top region of the tank 57 where the ultrasonic spectrum of the signal F is projected. This region is occupied by a cell 59 which comprises a thin film of oil separated from the fluid of the tank 57 by an extremely thin impermeable membrane. Under the action of the radiation pressure of the ultrasonic vibrations, the top face of the oil film deforms and reflects the incident light with a phase-modulation which corresponds to the distribution of ultrasonic energy as picked up by the cell 59. The tank 69 is likewise equipped with a cell 71 similar to that 59. To this end, an optical coupling device links the top faces of the two cells. This coupling device comprises two semi-reflecting plates 56 and 75 between which there have been arranged two lenses 78 and 79 to form an afocal optical system ; a diaphragm 77, at the focus of the lenses 78 and 79, selects the zero order light radiation diffracted by the cell 59, the higher orders, represented in dotted fashion, being blocked by the diaphragm 77. The light incident upon the top face of the cell 71 has already experienced a first phase modulation under the action of the cell 59 ; the light which emerges from the cell 71 thus contains two superimposed phase-modulations. The two modulations produced successively by the passage of the light through the ultrasonic tanks 57 and 69 correspond respectively to the spatial frequency spectra of the signals F and H so that the resultant modulation of the light emerging from the cell 71 corresponds to the product of the spectra projected by the tanks 57 and 69. This observation shows that the set of elements of FIG. 9, just described, is equivalent to the first part of a double-diffraction correlator including the associated filter. In other words, the ultrasonic tank 57 can be considered as containing the object and the first diffraction system cell, whilst the ultrasonic tank 69 is a filter generator. In order to obtain the desired correlation function, all that remains to be done is to carry out a second Fourier transform and this is what is done by the optical system which picks up the light reflected by the cell 71 after its transition through the semi-reflective plate 75. This optical system which builds up a second diffraction cell comprises a mirror 76 and a convergent lens 80 in the focal plane of which a selecting diaphragm 81 is mounted. The energy passing the diaphragm 81 is picked up by a lens 82 and supplied to a plane 83 where the correlation function is displayed.

Where it is a correlation function which is to be produced, those skilled in the art will appreciate that the filter action must constitute the conjugate of the function representing the spectrum of the signal associated with the filter. This condition can readily be satisfied by using a Fourier hologram to produce the filter. To this end, in the ultrasonic tank 69 there is immersed a point ultrasonic energy source 84 which obliquely illuminates the bottom face of the cell 71 ; this source 84 is excited in the same way as the source 73 by the generator 83. Because of the action of the source 84, the reflection of the light by the cell 71 takes place in accordance with the laws of hologram reconstruction, giving rise to diffracted waves or orders 0, +1, and −1. The −1 order gives rise in the focal plane of the lens 80 to a real image which is transmitted by the diaphragm 81; the 0 and +1 diffracted orders follow the dotted trajectories and are blocked by the diaphragm 81.

The correlation function appearing in the exit plane 83 is a cross-correlation function between the signals F and H. It is also possible to obtain the autocorrelation function of one of these signals. F for example, by transferring the substrate 60 from tank 57 to tank 69; in this case, the transcription device 66, 67 and the substrate 68 are superfluous. In closing, it is worth while mentioning that it is advantageous to pulse-operate the ultrasonic tanks. In this case, it is useful to arrange for the light source to operate synchronously with the input of ultrasonic energy to the cells 59 and 71; this synchronisation can be achieved by triggering the operation of the ultrasonic generator 85 with a pulse 86 furnished by the source 53.

What I claim is:

1. An ultrasonic data processing system comprising: at least one ultrasonic tank containing a fluid, at least one source of ultrasonic radiation (3,5) positioned for emitting through said fluid a beam of ultrasonic energy, at least one diffraction cell (8,9) positioned for receiving said beam, and ultrasonic detection means positioned for collecting the ultrasonic energy emerging from said diffraction cell; said diffraction cell comprising: stigmatic ultrasonic means (8) positioned for focussing said beam onto a spectral plane (9) pertaining to said cell and ultrasonic modulating object means (7) embodying said data positioned on the path of said beam for modulating said ultrasonic energy; said ultrasonic energy being constituted by ultrasonic longitudinal waves travelling through said fluid; said ultrasonic longitudinal waves being upon irradiation of said ultrasonic modulating object means, re-radiated for projection onto said spectral plane.

2. A system as claimed in claim 1, wherein said ultrasonic detection means comprise a supplementary diffraction cell (13, 14) and ultrasonic filter means (12); said ultrasonic filter means being arranged between the spectral plane (9) of said one diffraction cell and said supplementary diffraction cell.

3. A system as claimed in claim 1, wherein said source comprises at least one electromechanical transducer immersed in said fluid, and ultrasonic generator means for exciting said transducer.

4. A system as claimed in claim 1, wherein said ultrasonic detection means comprise at least one electromechanical transducer connected to indicator means for displaying the intensity of the ultrasonic radiation picked up by said transducer.

5. A system as claim 1, wherein the internals walls, of said tank are exposed to said ultrasonic radiation being lined with a layer of material absorbing the incident ultrasonic energy.

6. A system as claimed in claim 1, wherein said stigmatic ultrasonic means are constituted by convergent ultrasonic lenses.

7. A system as claimed in claim 6, wherein each of said lenses comprises a lenticular cavity filled with a fluid; said ultrasonic longitudinal waves propagating through the fluid filling said lenses at a velocity differing from that which they have in the fluid filling said ultrasonic tank.

8. A system as claimed in claim 6, wherein said lenses are cut from a solid material selectively transmitting longitudinal ultrasonic vibrations; the profile of said lenses having a minimum thickness at the centre; said solid material transmitting said ultrasonic longitudinal waves at a velocity higher than that which they have in the fluid filling said ultrasonic tank.

9. A system as claimed in claim 1, wherein said ultrasonic modulating object means comprise: a phase object cut from a solid material transmitting said ultrasonic longitudinal waves at a velocity differing from that which they have in said fluid.

10. A system as claimed in claim 9, wherein said ultrasonic modulating object means further comprise a phase-contrast ultrasonic arrangement (39, 40, 41) associated with said phase object (37).

11. A system as claimed in claim 10, wherein said phase-contrast arrangement is a double-diffraction system comprising two further diffraction cells in succession and a phase-contrast filter (40) arranged between said two further diffraction cells.

12. A system as claimed in claim 1, wherein said stigmatic ultrasonic means are constituted by at least one ultrasonic curved mirror.

13. A system as claimed in claim 12, wherein said curved mirror is a cylindrical mirror.

14. A system as claimed in claim 12, wherein said curved mirror has an elliptical profile.

15. A system as claimed in claim 14, wherein said stigmatic ultrasonic means further comprise another curved mirror having a parabolic profile, and associated homofocal with said curved mirror.

16. A system as claimed in claim 1, wherein said ultrasonic modulating object means (26, 27, 28) is an ultrasonic reflective modulator comprising a stack of plates with parallel faces, one of said faces being in contact with said fluid and a further one of said faces projecting outside the ultrasonic tank containing said fluid; said data being constituted by a relief impression applied against said further face; said system further comprising a semitransparent plate (31) immersed in said fluid between said stack and said source; said semi-reflecting plate transmitting the ultrasonic radiation emitted by said source toward said stack and also transmitting back toward said stigmatic ultrasonic means the ultrasonic radiation reflected from said stack in relation with the hollow parts of said relief impression.

17. An ultrasonic data processing system comprising: at least one ultrasonic tank containing a fluid, at least one source of ultrasonic radiation positioned for emitting through said fluid a beam of ultrasonic energy, at least one diffraction cell positioned for receiving said beam, ultrasonic detection means (10, 13, 14, 15) positioned for collecting the ultrasonic energy emerging from said diffraction cell, and transcription means (19, 20, 21) for transcribing said data; said diffractional cell including: stigmatic ultrasonic means (8) positioned for focussing said beam onto a spectral plane pertaining to said cell, and ultrasonic modulating object means (7) embodying said data positioned on the path of said beam for modulating said ultrasonic energy; said transcription means comprising means (20,21) for electromechanically engraving a thermoplastic substrate constituting said ultrasonic modulating object means and means (19) for displacing said substrate in relation to said engraving means; said engraving means comprising at least one engraving cutter integral with an electromechanical transducer receiving an electrical signal representative of said data, said ultrasonic energy being constituted by longitudinal waves travelling through said fluid ; said ultrasonic longitudinal waves being upon irradiation of said ultrasonic modulating object means, re-radiated for projection onto said spectral plane.

18. An ultrasonic data processing system comprising : at least one ultrasonic tank containing a fluid, at least one source of ultrasonic radiation positioned for emitting through said fluid a beam of ultrasonic energy, at least one diffraction cell positioned for receiving said beam, ultrasonic detection means (10, 13, 14, 15) positioned for collecting the ultrasonic energy emerging from said diffraction cell, and transcription means (19, 122, 123) for transcribing said data; said diffraction cell including : stigmatic ultrasonic means (8) positioned for focusing said beam onto a spectral plane pertaining to said cell, and ultrasonic modulating object means (7) embodying said data positioned on the path of said beam for modulating said ultrasonic energy ; said transcription means comprising a plurality of electrodes (122) aligned with one another and flush with the surface of a thermoplastic substrate, and a mating electrode (19) constituted by a cylinder transporting said substrate : said transcription means further comprising electrical means (24) controlled by said data, for applying between said cylinder and said electrodes electrical voltages ; said electrical voltages deforming said substrate under the action of electrostatic forces ; said cylinder being equipped with heating means for raising said substrate to a temperature at which the viscosity of the thermoplastic substrate is substantially reduced; said ultrasonic energy being constituted by longitudinal waves travelling through said fluid ; said ultrasonic longitudinal waves being upon irradiation of said ultrasonic modulating object means, re-radiated for projection onto said spectral plane.

19. An ultrasonic data processing system comprising : a first and a second ultrasonic diffraction cell ; each of said diffraction cells being located in an ultrasonic tank containing a fluid, at least one ultrasonic source immersed in said fluid, stigmatic ultrasonic means (64, 65, 73, 74) for focussing the ultrasonic energy emitted by said source, onto a spectral plane close to the surface of said fluid, a modulating object immersed in said fluid between said stigmatic ultrasonic means and said spectral plane, and an optical reflector element deformable under the action of the ultrasonic energy received by said spectral plane ; said processing system further comprising a coherent optical radiation source illuminating the reflector element of said first diffraction cell, an optical coupling device (56, 78, 77, 79, 75) linking the reflecting faces of said optical reflector elements, and an optical diffraction cell (80, 81) picking up the optical radiation emerging from the optical reflector element of said second diffraction cell.

20. A system as claimed in claim 19, wherein said optical coupling device comprises an afocal optical system having a common focal plane and a diaphragm arranged in said focal plane ; said diaphragm selectively transmitting that portion of the optical radiation emerging from the reflector element of said first diffraction cell, corresponding to the zero diffraction order.

21. A system as claimed in claim 19, wherein said optical diffraction cell comprises optical focussing means for focussing the radiation emerging from the optical reflector element of said second diffraction cell, onto a spectral plane, and a diaphragm located in the said last mentioned spectral plane ; said diaphragm selectively transmitting that portion of the optical radiation emerging from the optical reflector element of said second diffraction cell corresponding to one of the diffraction orders other than the zero order.

22. A system as claimed in claim 19, wherein data transcription means (61, 62, 66, 67) are associated with said first and second ultrasonic diffraction cells.

23. A system as claimed in claim 19, wherein data transcription means (61, 62) are associated with one of said first and second ultrasonic diffraction cells ; the modulating objects of said first and second ultrasonic diffraction cells being constituted by separate portions of the thermoplastic substrate engraved by said transcription means.

24. A system as claimed in claim 19, wherein the optical reflector element of said second ultrasonic diffraction cell receives an ultrasonic reference beam emitted by a supplementary ultrasonic source immersed in said fluid.

* * * * *